United States Patent [19]

Hitomi et al.

[11] Patent Number: 5,085,178
[45] Date of Patent: Feb. 4, 1992

[54] INTAKE PIPING STRUCTURE FOR MULTI-CYLINDER ENGINE

[75] Inventors: Mitsuo Hitomi; Toshihiko Hattori, both of Hiroshima, Japan

[73] Assignee: Mazda Motor Corporation, Hiroshima, Japan

[21] Appl. No.: 677,227

[22] Filed: Mar. 29, 1991

[30] Foreign Application Priority Data

Mar. 29, 1990 [JP] Japan .................................. 2-86325

[51] Int. Cl.⁵ .............................................. F02M 35/10
[52] U.S. Cl. ............................ 123/52 M; 123/52 MV
[58] Field of Search ......... 123/52 M, 52 MV, 52 MC, 123/52 MB, 52 MF, 52 ML, 55 VF, 55 VS, 55 VE, 55 V

[56] References Cited

U.S. PATENT DOCUMENTS

| | | | |
|---|---|---|---|
| 4,341,186 | 7/1982 | Mayr et al. | 123/52 M |
| 4,722,307 | 2/1988 | Okuno et al. | 123/52 M |
| 4,932,368 | 6/1990 | Abe et al. | 123/52 MV |
| 4,932,378 | 6/1990 | Hitomi et al. | 123/432 |
| 4,957,071 | 9/1990 | Matsuo et al. | 123/52 MV |
| 5,010,854 | 4/1991 | Suehiro et al. | 123/55 VE |

FOREIGN PATENT DOCUMENTS

57-148024 9/1982 Japan ................................ 123/52 MB
0222523 11/1985 Japan .................................. 123/52 M

*Primary Examiner*—David A. Okonsky
*Attorney, Agent, or Firm*—Fish & Richardson

[57] ABSTRACT

Plural cylinders are divided into cylinder groups consisting of the cylinders each having an equal inspiration stroke. The cylinder groups are so disposed as to allow their inspiration strokes to be apart from each other in a direction parallel to a crank axis in which a crankshaft extends. On its side surface, the cylinder head has an opening for an intake port which is communicated with an individual intake passage. Each of plural individual intake passage is extended from the respective cylinders for each cylinder group in the direction extending or elongated over the cylinder head and merged together at that location into a merged intake passage. The merged intake passage is extended toward the intermediate position between the two cylinder groups and thereafter curved, followed by extending toward the side of one side surface of the cylinder head.

28 Claims, 6 Drawing Sheets

INTAKE PIPING STRUCTURE FOR MULTI-CYLINDER ENGINE

BACKGROUND OF THE INVENTION

1. Field of the Invention

The present invention relates to an intake piping structure for a multi-cylinder engine.

2. Description of Related Art

It is known that the charging efficiency is enhanced by utilizing the inertia effect or the resonance effect of intake air within an air intake system in order to improve output performance of the engine for an automotive vehicle.

In charging by taking advantage of the inertia effect, on the one hand, when the engine is in a predetermined rotational region, or in a tuning rotational region, an intake negative pressure wave of intake air generated within the air intake port in association with opening an intake valve in an initial stage of an inspiration stroke of each cylinder is spread or travelled at sound speed toward the upstream side along the inside of an individual air intake passage and the negative pressure wave is reversed to positive pressure wave in a predetermined volume chamber. Then, the positive pressure wave is spread or travelled in the same pathway toward the downstream side so as to reach the same air intake port immediately before the intake valve is opened, thereby forcing the intake air into the combustion chamber by means of the positive pressure wave and enhancing the charging efficiency.

In charging by taking advantage of the resonance effect, on the other hand, plural cylinders of the engine are grouped into plural cylinder groups so as to allow each of the grouped cylinders to have an equal inspiration stroke with each other. The individual air intake passages of the plural cylinders of each cylinder group are united into one merged air intake passage (resonance intake passage) at their upstream ends, and the merged air intake passage is in its predetermined position provided with a pressure-reversible section consisting of a volume chamber. A pressure wave of intake air travelling back and forth between the pressure-reversible section and each cylinder is caused to exhibit resonance within the merged air intake passage by coinciding a phase of a basic intake pressure wave generated in the air intake port of each cylinder of the cylinder group in a tuning rotation range of the engine with a phase of a reflection pressure wave reversed in the pressure-reversible section, thereby allowing the resonance to generate a resonance pressure wave having a large amplitude due to a vibration of pressure generating mergedly within each cylinder. This resonance pressure wave forces the intake air into the combustion chamber of each cylinder, thereby enhancing the charging efficiency.

A surge tank is generally employed as a merging section in which the pressure wave of intake air is reversed by taking advantage of the inertia effect. The surge tank, however, presents the drawbacks that a distribution of intake air to each cylinder and a dynamic effect cannot be made uniform because the inner length between the upstream passage and each individual air intake passage or the length of each of the individual air intake passages themselves varies with cylinder.

In order to solve these drawbacks, Japanese Utility Model Laid-open (kokai) Publication No. 88,062/1985 proposes an intake piping structure for an engine. In this structure, a merging section on the upstream end of the individual air intake passage is formed as a space of a nearly truncated-conical shape. To a smaller-sized side end of the merging section is connected a downstream end of the merged air intake passage, while plural individual air intake passages are connected each to a larger-sized side end thereof. Further, openings at the upstream ends of the individual air intake passages are so disposed as to be in line symmetry with respect to the axial line passing through the center of the opening at the downstream end of the merged air intake passage. This structure allows the distance from the opening at the downstream end of the merged air intake passage to the opening at the upstream end of each of the individual air intake passages in the merging section to be substantially equal, thereby making the distribution of intake air for each cylinder uniform and reducing resistance to intake air by avoiding the rapid curvature of a flow passage of intake air. Further, as the opening at the upstream end of each individual air intake passage is disposed in a position close to each other, this arrangement allows each of the individual air intake passages to be employed as a volume chamber for the inertia effect within the other individual air intake passage, thereby minimizing and making the size of the merging section itself compact.

For a V-type engine, when the individual air intake passages are intersected with each other between the banks, a space between its left-hand and right-hand banks is rendered small, leading to poorness in service performance and making it difficult to enlarge a size of each passage. Further, for an inline engine, for instance, when a mechanical supercharger is disposed at the side of a cylinder head, it is impossible to lengthen the size of the individual air intake passage due to interference with a supercharger. Therefore, it is difficult to perform a good inertia effect of intake air in a low-speed region of the engine because limits are placed upon the length of each individual air intake passage.

Hence, in order to extend the length of the individual air intake passage by avoiding those problems, the structure of the engine may be constructed such that the individual air intake passage is extended over the cylinder head and connected to the merged air intake passage and the merged air intake passage is curved in such a U-shaped manner as extending in parallel to the individual air intake passage. This arrangement, however, increases the height of the engine because this structure causes all the individual air intake passages to be extended in a nearly parallel way over the cylinder head and the individual air intake passages and the merged air intake passage to be superposed.

Alternatively, the structure of the intake piping may be arranged such that the merged air intake passage for each cylinder group is curved toward one end side in the direction of disposition of the cylinders. This structure, however, causes the length of the merged air intake passage to differ from that of the other merged air intake passage, so that the distribution of intake air and the inertia effect are made different between the cylinder groups. Further, as this structure causes the merged air intake passages to be juxtaposed, the transverse width of the engine can be lengthened.

SUMMARY OF THE INVENTION

Therefore, the present invention has the object to provide an improvement in intake piping structure for a multi-cylinder engine so adapted to make the lengths of the individual air intake passages uniform between the cylinder groups and minimize the height and width of the multi-cylinder engine as a whole, including the individual air intake passages and the merged air intake passages.

In order to achieve the aforesaid object, the present invention consists of an intake piping structure for a multi-cylinder engine having plural cylinders disposed in a direction parallel to a crank axis in which a crankshaft extends, wherein:

said plural cylinders are grouped into a first cylinder group in which each of plural cylinders located on one end side in the direction parallel to the crank axis are so disposed as to have an equal distance of an inspiration stroke and a second cylinder group in which plural cylinders located on the other end side in the direction parallel to the crank axis are so disposed as to have an equal distance of an inspiration stroke;

an individual air intake passage for each of the cylinders is connected to an air intake port for each of the respective cylinders having an opening on one side surface of a cylinder head;

each individual air intake passage for the first cylinder group is so disposed as to extend over the corresponding cylinder head and connected to a first merged air intake passage elongated over the corresponding cylinder head;

each individual air intake passage for the second cylinder group is so disposed as to extend over the corresponding cylinder head and connected to a second merged air intake passage elongated over the corresponding cylinder head; and each of the first merged air intake passage and the second merged air intake passage is so disposed as to extend toward a middle position between the first cylinder group and the second cylinder group, then to be curved toward one side of the corresponding cylinder head and eventually to be united together with each other.

In accordance with the present invention, the individual air intake passages communicated with the cylinders for each of the cylinder groups are extended over the cylinder head and connected to the merged air intake passage which in turn is first curved toward the middle position between the cylinder groups and then extended toward one side of the cylinder head having an opening to the air intake port. Hence, the merged air intake passages are disposed within a dead space created by a gathering of the individual air intake passages, so that the merged air intake passages and the individual air intake passages are not superposed, thereby lowering the height of the engine.

Further, since the merged air intake passages for each of the cylinder groups are curved toward the middle position between the cylinder groups and thereafter merged or united together, the length of each of the merged air intake passages can be made substantially equal to each other, thereby equalizing the distribution of intake air, the resonance effect, etc. and minimizing the transverse width of the engine.

Other objects, features and advantages of the present invention will become apparent in the course of the description of the preferred embodiments with reference to the accompanying drawings.

BRIEF DESCRIPTION OF THE DRAWINGS

FIGS. 1 to 3 are directed to a first embodiment according to the present invention, in which

FIGS. 4 and 5 are directed to a second embodiment according to the present invention, in which

DESCRIPTION OF THE PREFERRED EMBODIMENTS

The present invention will be described more in detail with reference to the accompanying drawings.

Figures 1, 3:
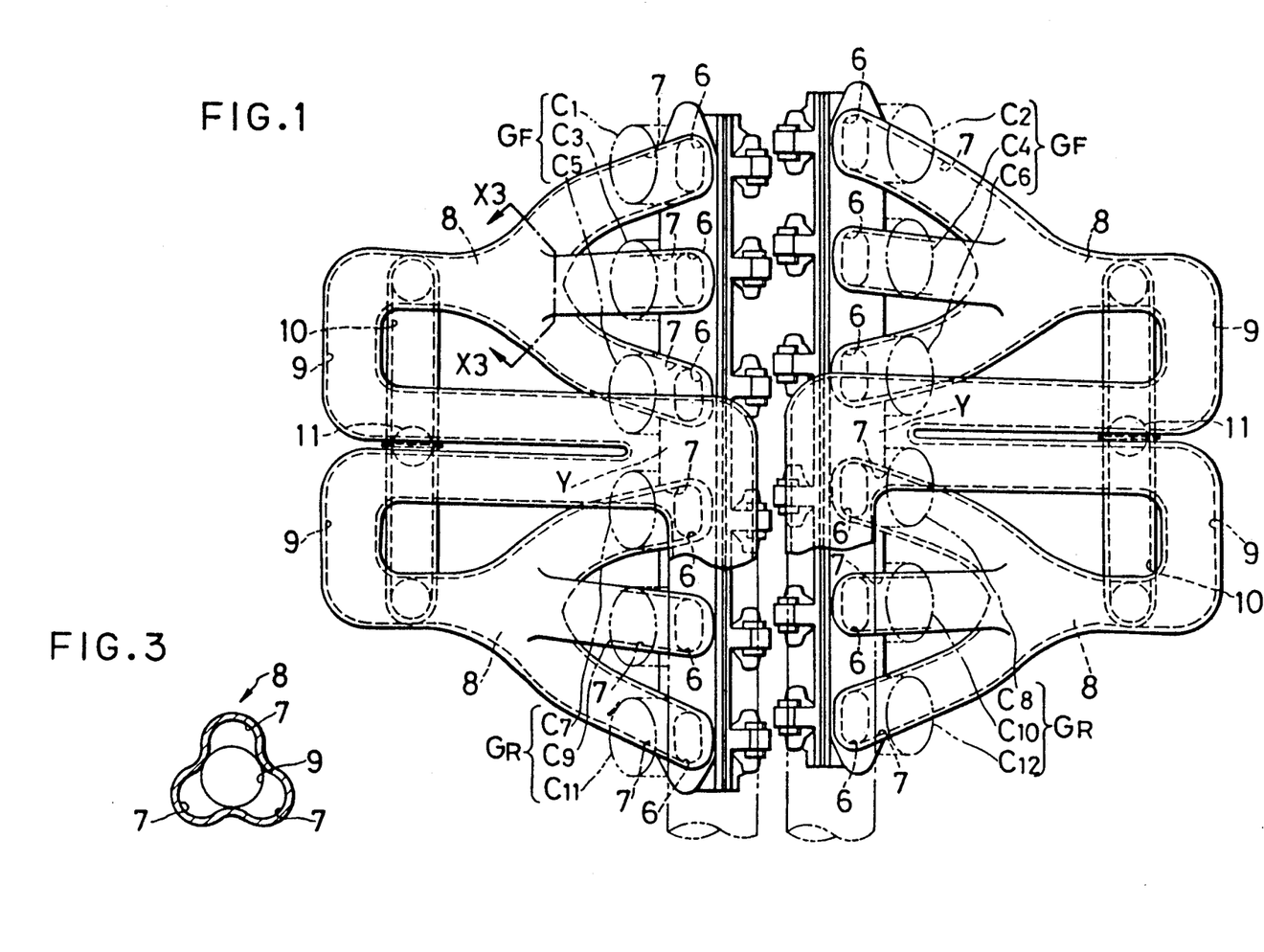
FIG. 1 is a plan view showing an air intake system.
FIG. 3 is a sectional view taken along line X3—X3 of FIG. 3.
Figure 2:
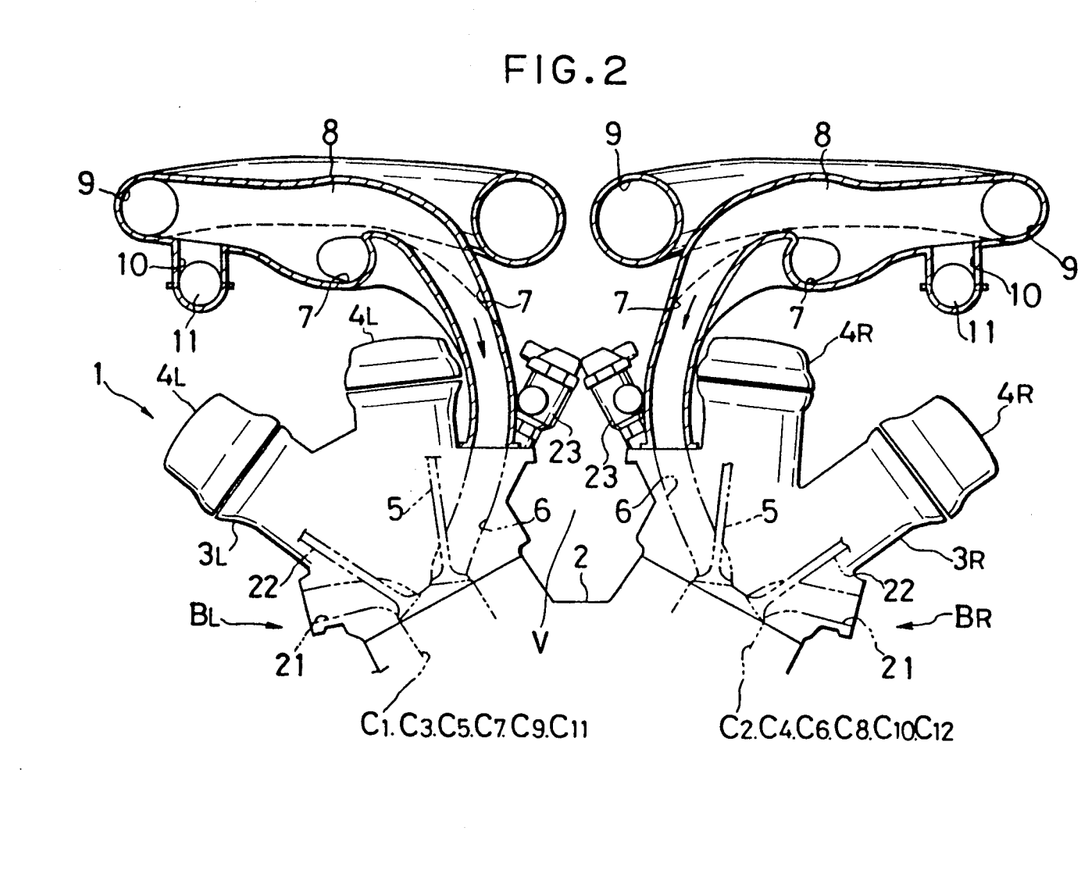
FIG. 2 is a longitudinal sectional view showing the engine and the air intake system.

FIGS. 1 and 2 show the first embodiment in which the present invention is applied to a V-type 12-cylinder engine. Referring to FIGS. 1 and 2, reference numeral 1 denotes a V-type 12-cylinder DOHC engine having a left-hand bank BL and a right-hand bank BR. The engine 1 comprises a cylinder block 2 having a nearly V-shaped section, a right-hand cylinder head 3R, a left-hand cylinder head 3L, and two pairs of right-hand and left-hand cylinder head covers 4R and 4L. The left-hand and right-hand cylinder heads 3L and 3R are fitted together on an upper surface of the cylinder block 2, and a pair of the left-hand cylinder head covers 4L are fitted together on an upper surface of the left-hand cylinder head 3L, while a pair of the right-hand cylinder head covers 4R are fitted together on an upper surface of the right-hand cylinder head 3R. The cylinder block 2 of the left-hand bank BL (on the left-hand side in the drawing) is provided with odd-numbered cylinders including first cylinder C1, third cylinder C3, fifth cylinder C5, seventh cylinder C7, ninth cylinder C9 and eleventh cylinder C11, while the cylinder block 2 of the right-hand bank BR (on the right-hand side in the drawing) is provided with even-numbered cylinders including second cylinder C2, fourth cylinder C4, sixth cylinder C6, eighth cylinder C8, tenth cylinder C10 and twelfth cylinder C12. The odd-numbered cylinders are disposed in series in the lengthwise direction of the left-hand bank BL and the even-numbered cylinders are disposed in series in the lengthwise direction of the right-hand bank BR. These cylinders are so arranged as to proceed with an inspiration stroke in the order from the first cylinder C1 through the twelfth cylinder C12, the ninth cylinder C9, the fourth cylinder C4, the fifth cylinder C5, the eighth cylinder C8, the eleventh cylinder C11, the second cylinder C2, the third cylinder C3, the tenth cylinder C10 and the seventh cylinder C7 to the sixth cylinder C6. In this embodiment, six out of the twelve cylinders disposed on the left-hand bank BL are divided into tree cylinders constituting a front group GF (cylinder C1, cylinder C3 and cylinder C5) and another three cylinders constituting a rear cylinder group GR (cylinder C7, cylinder C9 and cylinder C11). Each of the three cylinders constituting one cylinder group is so arranged as to have an inspiration stroke in an equal distance. Likewise, three out of the six cylinders disposed on the right-hand bank BR are divided into three cylinders constituting a front cylinder group GF (cylinder C2, cylinder C4 and cylinder C6) and another three cylinders constituting a rear cylinder group GR (cylinder C8, cylinder C10 and cylinder C12). Each of the three cylinders for each cylinder group is so arranged and grouped as to have an inspiration stroke of an equal distance. Thus, in this embodiment, the cylinders of the engine 1 are divided as a whole into four cylinder groups, two cylinder groups GF and GR on the left-hand bank BL and two cylinder groups GF and GR on the right-hand bank BR.

On a side surface of the respective cylinder heads 3L and 3R between the banks BL and BR, i.e. a surface facing a V-shaped central space V of the V-bank formed between the left-hand bank BL and the right-hand bank BR, there is formed an opening of an air intake port 6 which is communicated with each of the cylinders C1 to C12 through an air intake valve 5. To each air intake port 6 is connected a downstream end of an individual air intake passage 7. Each of the individual air intake passages 7 is curved first upwards and then in a direction nearly perpendicular to the crank axis and apart from the V-shaped central space V of the V-bank so as to extend over the cylinder head 3L or 3R of the respective cylinder bank BL or BR in a nearly horizontal direction. An upper end of each individual air intake passage 7 in each cylinder group GF or GR is merged or united into one passage which in turn is communicated with the downstream end of a merged air intake passage 9 for each cylinder group GF or GR.

Specifically, for three individual air intake passages 7 of each cylinder group GF or GR, the central individual air intake passage 7 interposed between the forward and rearward individual air intake passages 7 and 7 is so arranged as to have a larger radial curvature at its portion extending upwards than a radial curvature at the corresponding portion of each of the forward and rearward individual air intake passages 7 and 7 extending upwards. Further, the radial curvature of each of the forward and rearward individual air intake passages 7 and 7 at its portion extending nearly horizontally is so arranged as to be larger than a radial curvature at a portion of the central individual air intake passage 7 extending in a nearly horizontal direction. Although the upstream end of the central individual air intake passage 7 is located in a position somewhat higher than that of each of the forward and rearward individual air intake passages 7 and 7, the forward and rearward individual air intake passages 7 and 7 are curved so as to lead to the upper end of the central individual air intake passage 7. In other words, both of the forward and rearward individual air intake passages 7 and 7 are so arranged as to face the merged air intake passage 9 at the radial curvature larger than the central individual air intake passage 7. The arrangement for the three individual air intake passages 7, 7 and 7 of each cylinder group serves as equalizing the length of each of the three individual air intake passages, resistance to a flow of intake air uniform, etc.

The upstream ends of the three individual air intake passages 7 in one cylinder group are merged together and then connected to a merging section 8 which in turn is communicated with a merged air intake passage 9. The merging section 8 is constructed such that its sectional opening area is gradually increased from its upstream end side (a connection section on the downstream end side of the merged air intake passage 9) to its downstream end side (a connection section on the upstream end side of the three individual air intake passages 7). Further, as sectionally shown in FIG. 3, the three individual air intake passages 7, 7 and 7 are communicated with the merging section 8 in such a manner that the axis of each individual air intake passage 7 is so arranged as to exist coaxially around the axis of the merged air intake passage 9 in an equally spaced relationship at an equal angle and an equal radius.

The merged air intake passage 9 for of each of the cylinder groups GF and GR is disposed such that it first extends from its merging section 8 toward the direction apart in a nearly horizontal direction from the V-shaped central space V of the V-bank over the respective cylinder head 3L and 3R, then it is curved toward the central side of the cylinder line of the respective banks BL and BR, and further it is curved toward the V-shaped central space V thereof. As a whole, the merged air intake passage 9 is of a nearly U-shaped form. For the merged air intake passage 9 of the forward cylinder group GF, the curvature toward the central side of the cylinder line of the respective bank means that it is curved rearwards (downwards in FIG. 1). And, for the merged air intake passage 9 of the rearward cylinder group GR, the curvature toward the central side of the cylinder line thereof means that it is curved forwards (upwards in FIG. 1). Further, each of the merged air intake passages 9 for the forward and rearward cylinder groups GF and GR for each of the banks BL and BR is so arranged as to extend first in a nearly horizontal direction toward the V-shaped central space V of the V-bank and then to be merged or united together into a merging section Y nearly upward of the air intake port 6. The merging section Y of the merged air intake passages 9 and 9 for the respective cylinder groups GF and GR is then curved forwards and thereafter extends forwards (upwards in FIG. 1) along and in parallel to the direction of the cylinder line (in the direction parallel to the crank axis) of the respective bank BL and BR. The upstream end of the merging section Y thereof is connected to a throttle body (not shown).

Further, the merged air intake passage 9 for the forward cylinder group GF on the left-hand bank BL is communicated with the merged air intake passage 9 for the rearward cylinder group GR thereon through a communication passage 10 for resonance. Likewise, the merged air intake passage 9 for the forward cylinder group GF on the right-hand bank BR is communicated with the merged air intake passage 9 for the rearward cylinder group GR thereon through another communication passage 10 for resonance. The resonance communication passage 10 is so disposed as to communicate the merged air intake passage 9 of the forward cylinder group GF with the merged air intake passage 9 of the rearward cylinder group GR at their respective portions interposed between their connection sections (their merging sections 8) on the upstream end of their respective merged air intake passages 7, 7 and their corner sections at which the merged air intake passages 7 and 7 are curved toward the center of the cylinder line. Further, the resonance communication passage 10 is so constructed as to extend underneath the merged air intake passage 9 in a lengthwise direction of the bank (in the direction parallel to the crank axis). The resonance communication passage 10 is provided with a switch valve 11 consisting of a butterfly valve which is constantly closed yet openable in a predetermined rotational range of the engine 1. The switch valve 11 is controlled to open or close the communication passage 10, thereby shifting a reverse portion of air intake pressure wave to be reversed by the resonance effect between the merging section Y on the upstream side of the merged air intake passage 9 and a connection section to the resonance communication passage 10 for the merged air intake passage 9 to change the number of revolutions tuning with resonance.

In the drawings, reference numeral 21 denotes an exhaust port to be opened or closed by an exhaust valve 22, and reference numeral 23 denotes an injector.

In this embodiment, as described hereinabove, the three individual air intake passages 7 communicated with the three cylinders C1 to C12 for each of the forward and rearward cylinder groups GF and GR on each of the left-hand and right-hand banks BL and BR, respectively, are extended upwards over the respective left-hand and right-hand cylinder heads 3L and 3R and then collected or merged together at one site to form the merging section which in turn is connected to the merged air intake passage 9 for each of the forward and rearward cylinder groups GF and GR. Hence, the individual air intake passages 7 are collected or merged and curved in the manner as described hereinabove as to leave a dead space on the central side of the cylinder line over the cylinder heads 3L and 3R for each of the respective left-hand and right-hand banks BL and BR. Therefore, each of the merged air intake passages 9 and 9 is disposed such that the portion thereof curved toward the center of the cylinder line over the respective cylinder heads 3L and 3R and then extending toward the V-shaped central space V of the V-bank is allowed to pass through the dead space. Consequently, the merged air intake passage 9 is not superposed with the individual air intake passages 7, thereby lowering the height of the engine 1.

As the merged air intake passages 9 and 9 for the respective forward and rearward cylinder groups GF and GR for each of the left-hand and right-hand banks BL and BR are so disposed as to extend toward the V-shaped central space V of the V-bank after they have been curved toward the central side of the cylinder line, the length of each merged air intake passage 9 can be made substantially equal to each other, thereby equalizing a distribution of intake air and resonance effect between the merged air intake passages 9 and 9, etc. Further, the two merged air intake passages 9 and 9 are not juxtaposed side by side in a widthwise direction, so that projecting portions can be made less, thereby reducing the transverse width of the engine 1.

Further, as the upstream ends of the individual air intake passages 7 for each of the forward and rearward cylinder groups GF and GR are connected to the merged air intake passage 9 through the merged section 8 of a compact size, the merging section 8 serving as a reverse portion for reversing the pressure by means of the inertia effect can be made smaller in size, thereby producing a so large dead space that it is advantageous for the disposition of the merged air intake passage 9. Further, this arrangement for the merging section 8 permits a good distribution of intake air and a low resistance to intake air among the cylinders C1 to C12 between the forward and rearward cylinder groups GF and GR.

Furthermore, as described hereinabove, each of the individual air intake passages 7 for each of the forward and rearward cylinder groups GF and GR is extended from the surface on the side of the V-shaped central space of the V-bank in a direction over the corresponding cylinder head 3L or 3R, then merged or united together with each other, and thereafter connected to the merged air intake passage 9, so that the individual air intake passages 7 on the left-hand bank BL are not intersected with the individual air intake passages 7 on the right-hand bank BR at a portion between the left-hand and right-hand banks BL and BR. This arrangement for the individual air intake passages 7 can enlarge a passage size of the individual air intake passage 7 and enhance service performance.

It is to be noted herein that the air intake passages 7 and 9 are disposed in such a manner as elongated in a nearly horizontal direction over the cylinder heads. In particular, when the cylinder block 2 is leaned to the left or right in FIG. 1, it is preferred that they are disposed so as to assume a virtual plane nearly horizontal to such a virtual plane as intersecting a virtual straight line which in turn intersects the crank axis and passes through the central position between the left-hand and right-hand sides of the V-shaped central space V of the V-bank.

Figure 4:
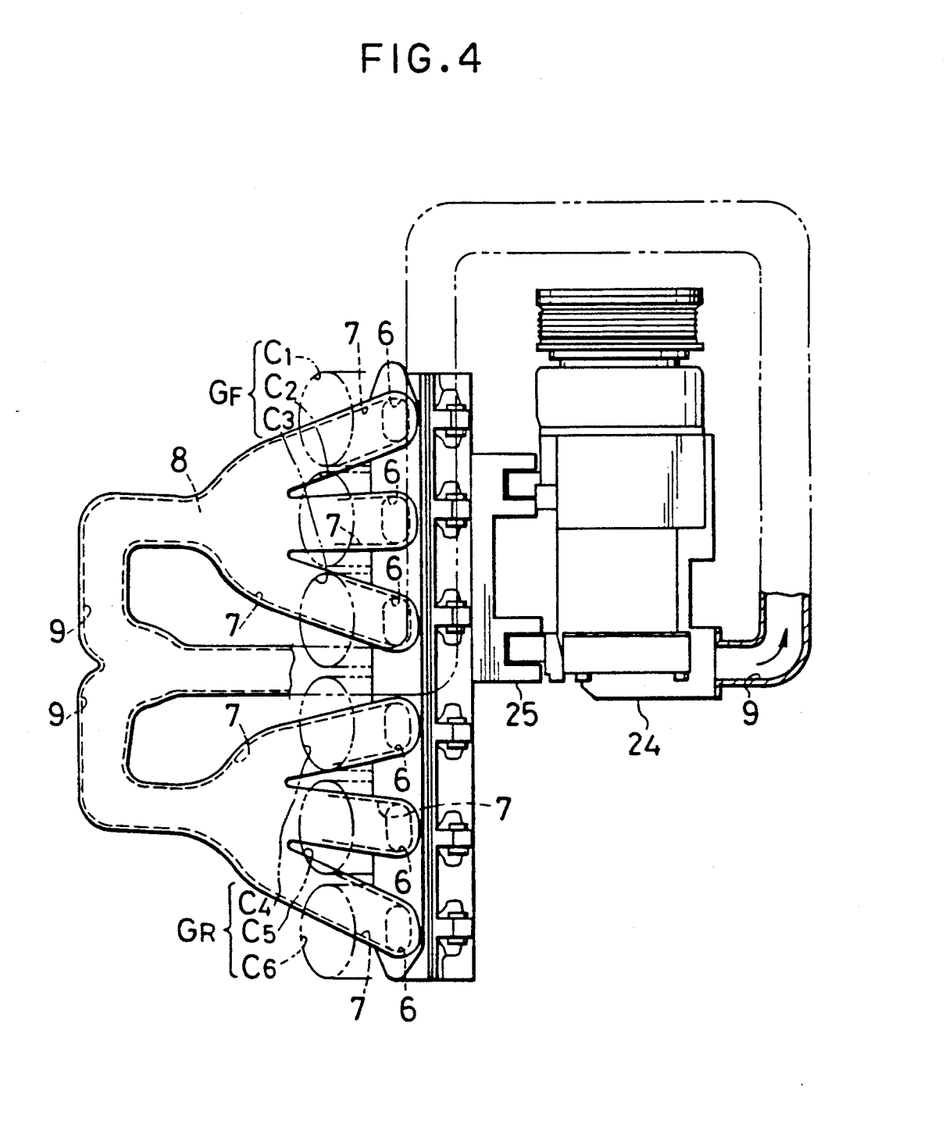
FIG. 4 is a plan view corresponding to FIG. 1
Figure 5:
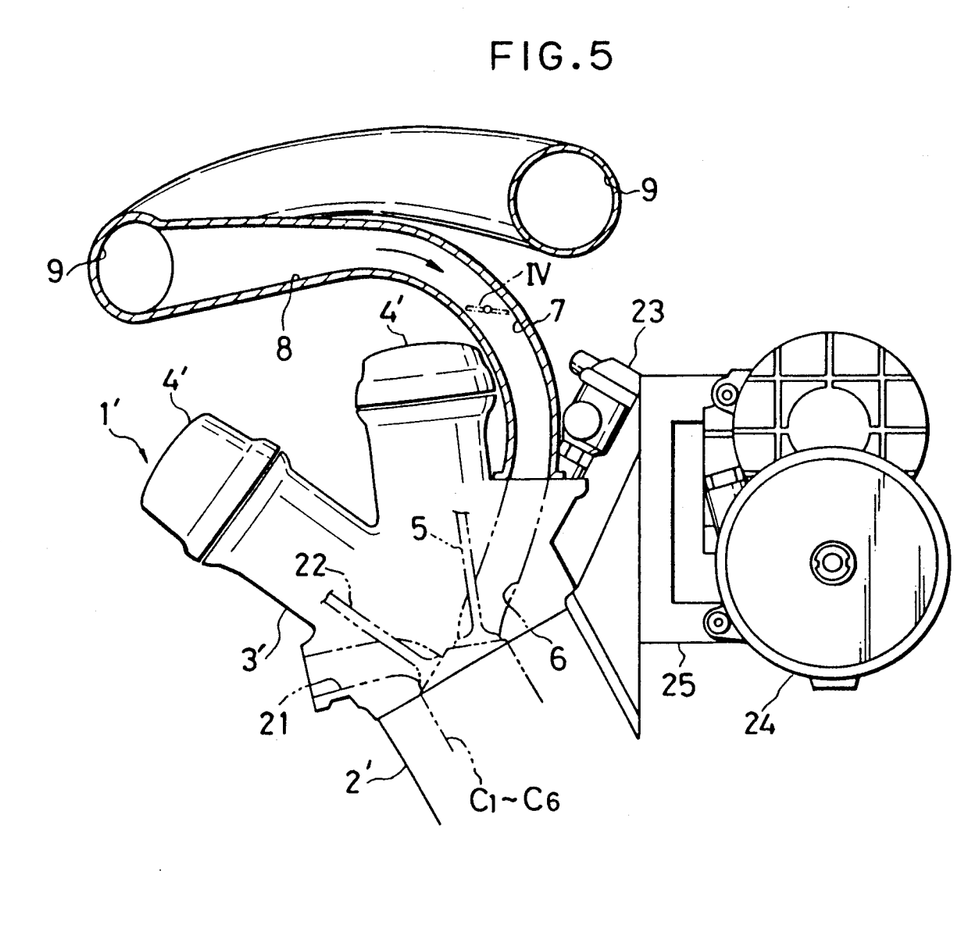
FIG. 5 is a longitudinal sectional view corresponding to FIG. 2.

FIGS. 4 and 5 show a second embodiment according to the present invention. In the drawings, the same elements as in FIGS. 1 and 2 are provided with the identical reference numerals and symbols, so that duplicate description will be omitted from the following description. The second embodiment is directed to an inline 6-cylinder engine 1' to which the present invention is applied.

In this embodiment, a cylinder block 2' of the engine 1' is leaned to the left when looked from the rear side and provided with six cylinders disposed in series, i.e. first cylinder C1, second cylinder C2, third cylinder C3, fourth cylinder C4, fifth cylinder C5 and sixth cylinder C6. The cylinders C1 to C6 may be so disposed as to proceed with an inspiration stroke in the sequence from the first cylinder C1 through the fifth cylinder C5, the third cylinder C3, the sixth cylinder C6 and the second cylinder C2 to the fourth cylinder C4. The cylinders C1 to C6 are divided into three out of the six cylinders constituting a forward cylinder group GF and another three out of six cylinders constituting a rearward cylinder group GR, so as to allow the three cylinders of each cylinder group to have an inspiration stroke substantially equal to each other. In this case, the forward cylinder group GF comprises the first cylinder C1, the second cylinder C2 and the third cylinder C3, while the rearward cylinder group GR comprises the fourth cylinder C4, the fifth cylinder C5 and the sixth cylinder C6.

To the side surface on the right side of the cylinder block 2' is mounted through a bracket 25 to a mechanical supercharger 24 driven by the engine 1'. The right-hand side of a cylinder head 3' has an opening for an air intake port 6 communicated with each of the cylinders C1 to C6. Each of the air intake ports 6 is connected to a downstream end of an individual air intake passage 7 which in turn is so disposed as to extend upwards and then curved to the left extending in an approximately horizontal direction over the cylinder head 3'. The downstream ends of the three cylinders in each of the forward and rearward cylinder groups GF and GR are merged or united together and then connected to the downstream end of the merged air intake passage 9 for each of the cylinder groups GF and GR. This embodiment differs from the first embodiment in the fact that the upstream ends of the three individual air intake passages 7, 7, 7 for each of the cylinder groups GF and GR are merged or united at one location in such a state that they are disposed nearly in one row and then connected to the merged air intake passage 9. Further, the upstream ends of the three individual air intake passages 7, 7, 7 are located in the same axial lines as the downstream end of the merged air intake passage 9.

The merged air intake passage 9 for each of the cylinder groups GF and GR is so disposed as to extend to the left in a nearly horizontal direction over the cylinder head 3' and then to be curved toward the central side of the cylinder line, followed by extending while curving in a short length to the right. Consequently, the merged air intake passage 9 assumes a U-shaped form as a whole. In other words, the merged air intake passage 9 for the forward cylinder group GF is disposed extending to the left in a nearly horizontal direction and curving rearwards (downwards in FIG. 4), while the merged air intake passage 9 for the rearward cylinder group GR is disposed so as to be curved forwards (upwards in FIG. 4) in substantially the same manner as the merged air intake passage 9 for the forward cylinder group GF. The merged air intake passages 9 are merged or united together with each other immediately after they extend to the right in FIG. 4, and the merged air intake passages 9 are then extended to the right in a nearly horizontal direction and curved forwards approximately upward of the air intake port 6, followed by extending forwards (upwards in FIG. 4) along the direction of the cylinder line (in the direction parallel to the crank axis) so as to allow its upstream end to be connected to a discharge outlet having opening at the rearward end on the right side of the supercharger 24.

Therefore, this embodiment can achieve substantially the same effects as the first embodiment as described hereinabove. In particular, even if the supercharger 24 is mounted on the side of the cylinder block 2' of the engine 1', the length of the air intake passages 7 and 9 can be lengthened without causing any interference with the supercharger 24 and it is advantageous to charge intake air with the inertia effect.

FIGS. 6 to 9 show other embodiments according to the present invention and are plan views showing a portion corresponding to FIG. 1 or FIG. 4. It is noted that FIGS. 6 to 9 show outlines of the relationship between the disposition of the air intake ports 6, individual air intake passages 7 and merged air intake passages 9. Following description will be made only on the essential portions because the other portions will be readily understood from the above description.

Figure 6:
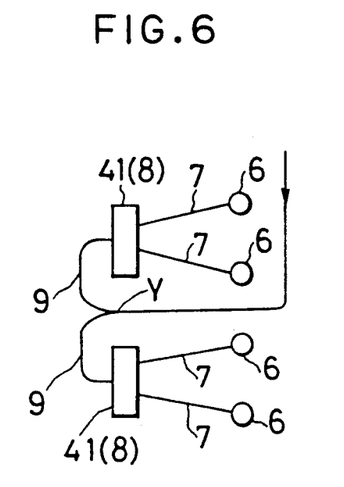
FIGS. 6 to 9 are directed to other embodiments according to the present invention and diagrammatic representations showing the disposition of the individual air intake passages and the merged air intake passages vs. the air intake ports, which correspond to FIG. 1 or FIG. 4.

FIG. 6 shows the instance where the present invention is applied to an inline 4-cylinder engine, in which a merging section between the individual air intake passages 7 and the merged air intake passages 9 is provided with a surge tank 41, in place of the collection section 8 as in the embodiments as described hereinabove.

Figure 7:
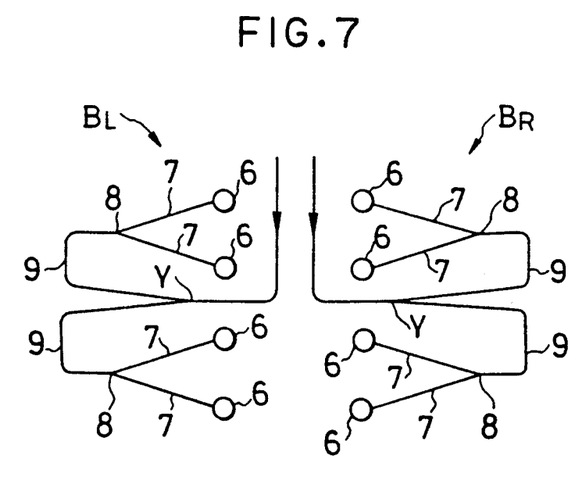

FIG. 7 shows the instance where the present invention is applied to a V-type 8-cylinder engine.

Figure 8:
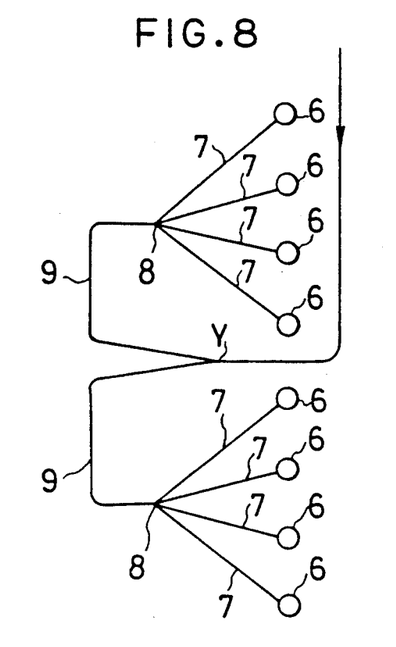

FIG. 8 shows the instance where the present invention is applied to an inline 8-cylinder engine and each cylinder group comprises four cylinders.

Figure 9:
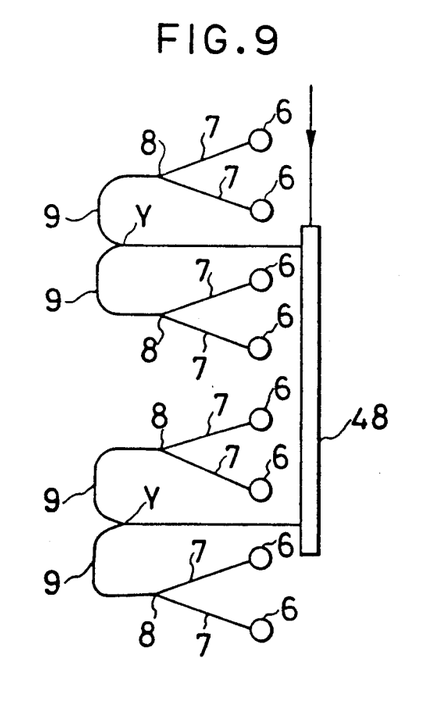

FIG. 9 shows the case where the present invention is applied to an inline 8-cylinder engine. In this embodiment, each cylinder group comprises two cylinders and intake air is supplied to the merged air intake passages 9 through a lengthy and flat surge tank 48 disposed in the vicinity of the air intake ports 6, although the surge tank 48 is not necessarily required.

Although the above description is directed to the preferred embodiments, a throttle valve may be mouted to each individual air intake passage and an example of the throttle valve to be mounted to each of the individual air intake passage is shown as reference numeral IV in FIG. 5.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. An intake piping structure for a multi-cylinder engine having plural cylinders disposed in a direction parallel to a crank axis; wherein:

said plural cylinders are grouped into a first cylinder group in which each of plural cylinders located on one end side in the direction parallel to the crank axis are so disposed as to have an equal distance of an inspiration stroke and a second cylinder group in which plural cylinders located on the other end side in the direction parallel to the crank axis are so disposed as to have an equal distance of an inspiration stroke;

an individual air intake passage for each of the cylinders is connected to an air intake port for each of the respective cylinders having an opening on one side surface of a cylinder head;

each individual air intake passage for the first cylinder group is so disposed as to extend over the corresponding cylinder head and connected to a first merged air intake passage in a position over the corresponding cylinder head;

each individual air intake passage for the second cylinder group is so disposed as to extend over the corresponding cylinder head and connected to a second merged air intake passage in a position over the corresponding cylinder head; and each of the first merged air intake passage and the second merged air intake passage is so disposed as to extend toward a middle position between the first cylinder group and the second cylinder group, then to be curved toward one side of the corresponding cylinder head and eventually to be united together with each other.

2. An intake piping structure for a multi-cylinder engine as claimed in claim 1, wherein each individual air intake passage is so disposed as to extend upwards from one side of the corresponding cylinder head and then to be curved toward and in a position over the corresponding cylinder head.

3. An intake piping structure for a multi-cylinder engine as claimed in claim 1, wherein a portion of each of the merged air intake passage extending toward one side surface of the cylinder head is so disposed as to intersect in a direction nearly perpendicular to the crank axis.

4. An intake piping structure for a multi-cylinder engine as claimed in claim 1, wherein the individual air intake passage out of the individual air intake passages of the first cylinder group located closest to the second cylinder group is curved so as to be spaced apart from the second cylinder group in the direction parallel to the crank axis; and the individual air intake passage out of the individual air intake passages of the second cylinder group located closest to the first cylinder group is curved so as to be spaced apart from the first cylinder group in the direction parallel to the crank axis.

5. An intake piping structure for a multi-cylinder engine as claimed in claim 1, wherein:

a merging section in which each of the individual air intake passages and the merged air intake passage are merged together for the first cylinder group is so disposed as to exist in a nearly middle position of the individual air intake passages for the first cylinder group in the direction parallel to the crank axis; and a merging section in which each of the individual air intake passages and the merged air intake passage are merged together for the second cylinder group is so disposed as to exist in a nearly middle position of the individual air intake passages for the second cylinder group in the direction parallel to the crank axis.

6. An intake piping structure for a multi-cylinder engine as claimed in claim 1, wherein each of the merged air intake passages is so disposed as to extend from the merging section for the individual air intake in a direction spaced apart from one side of the cylinder head and then to extend toward a middle position between the first cylinder group and the second cylinder group.

7. An intake piping structure for a multi-cylinder engine as claimed in claim 1, wherein a merging section in which the individual air intake passage and the merged air intake passage are merged together is so set as to increase a sectional area thereof gradually from the side of the merged air intake passage to the side of the individual air intake passage.

8. An intake piping structure for a multi-cylinder engine as claimed in claim 1, wherein the multi-cylinder engine is an inline multi-cylinder engine having plural cylinders with even numbers of four or more as a whole.

9. An intake piping structure for a multi-cylinder engine as claimed in claim 1, wherein the multi-cylinder engine is a V-type multi-cylinder engine having plural cylinders with even numbers of eight or more as a whole with cylinders having even numbers of four or more on each of left-hand and right-hand banks.

10. An intake piping structure for a multi-cylinder engine as claimed in claim 1, wherein there is one set of a combination of the first cylinder group with the second cylinder group in the direction parallel to the crank axis.

11. An intake piping structure for a multi-cylinder engine as claimed in claim 1, wherein there are two sets of a combination of the first cylinder group with the second cylinder group, or more, in the direction parallel to the crank axis.

12. An intake piping structure for a multi-cylinder engine as claimed in claim 8, wherein:

the multi-cylinder engine is an inline 4-cylinder engine having a first cylinder, a second cylinder, a third cylinder and a fourth cylinder disposed from one end side to the other end side in the direction parallel to the crank axis;

the first cylinder and the second cylinder constitute the first cylinder group; and the third cylinder and the fourth cylinder constitute the second cylinder group.

13. An intake piping structure for a multi-cylinder engine as claimed in claim 8, wherein:

the multi-cylinder engine is an inline 6-cylinder engine having a first cylinder, a second cylinder, a third cylinder, a fourth cylinder, a fifth cylinder and a sixth cylinder disposed from one end side to the other end side in the direction parallel to a crank axis;

the first cylinder, the second cylinder and the third cylinder constitute the first cylinder group; and the fourth cylinder, the fifth cylinder and the sixth cylinder constitute the second cylinder group.

14. An intake piping structure for a multi-cylinder engine as claimed in claim 8, wherein:

the multi-cylinder engine is an inline 8-cylinder engine having a first cylinder, a second cylinder, a third cylinder, a fourth cylinder, a fifth cylinder, a sixth cylinder, a seventh cylinder and an eighth cylinder disposed from one end side to the other end side in the direction parallel to the crank axis;

the first cylinder, the second cylinder, the third cylinder and the fourth cylinder constitute the first cylinder group; and the fifth cylinder, the sixth cylinder, the seventh cylinder and the eighth cylinder constitute the second cylinder group.

15. An intake piping structure for a multi-cylinder engine as claimed in claim 8, wherein:

the multi-cylinder engine is an inline 8-cylinder engine having a first cylinder, a second cylinder, a third cylinder, a fourth cylinder, a fifth cylinder, a sixth cylinder, a seventh cylinder and an eighth cylinder disposed from one end side to the other end side in the direction parallel to the crank axis;

the first cylinder and the second cylinder constitute the first cylinder group;

the third cylinder and the fourth cylinder constitute the second cylinder group in a combination with the first cylinder group;

the fifth cylinder and the sixth cylinder constitute another first cylinder group; and the seventh cylinder and the eighth cylinder constitute another second cylinder group in a combination with the another first cylinder group.

16. An intake piping structure for a multi-cylinder engine as claimed in claim 9, wherein:

the multi-cylinder engine is a V-type 8-cylinder engine;

two out of four cylinders on the left-hand bank, located on one side in the direction parallel to the crank axis, constitute the first cylinder group, and the other two out of four cylinders located on the other side in the direction parallel to the crank axis, constitute the second cylinder group in a combination with the first cylinder group; and two out of the four cylinders on the right-hand bank, located on one side in the direction parallel to the crank axis, constitute the first cylinder group, and the other two out of the four cylinders, located on the other side in the direction parallel to the crank axis, constitute the second cylinder group in a combination with the first cylinder group.

17. An intake piping structure for a multi-cylinder engine as claimed in claim 9, wherein:

the multi-cylinder engine is a V-type 12-cylinder engine;

three out of six cylinders on the left-hand bank, located on one side in the direction parallel to the crank axis, constitute the first cylinder group, and the other three out of the six cylinders, located on the other side in the direction parallel to the crank axis, constitute the second cylinder group in a combination with the first cylinder group; and three out of six cylinders on the right-hand bank, located on one side in the direction parallel to the crank axis, constitute another first cylinder group, and the other three out of the six cylinders, located on the other side in the direction parallel to the crank axis, constitute the second cylinder group in a combination with the another first cylinder group.

18. An intake piping structure for a multi-cylinder engine as claimed in claim 9, wherein each of air intake ports has an opening facing a V-shaped central space of a V-bank formed between the right-hand bank and the left-hand bank.

19. An intake piping structure for a multi-cylinder engine as claimed in claim 18, wherein:
each of the individual air intake passages connected to the air intake port on the left-hand bank is so disposed as to extend over the cylinder head of the left-hand bank; and
each of the individual air intake passages connected to the air intake port on the right-hand bank is so disposed as to extend over the cylinder head of the right-hand bank.

20. An intake piping structure for a multi-cylinder engine as claimed in claim 1, wherein each of the individual air intake passages is provided with a throttle valve.

21. An intake piping structure for a multi-cylinder engine as claimed in claim 1, further comprising:
a communication passage communicating the first merged air intake passage with the second merged air intake passage; and
a switch valve for opening or closing the communication passage.

22. An intake piping structure for a multi-cylinder engine as claimed in claim 21, wherein the communication passage is located underneath each of the individual air intake passages and each of the merged air intake passages.

23. An intake piping structure for a multi-cylinder engine as claimed in claim 1, wherein:
the number of plural cylinders constituting each of the first cylinder group and the cylinder group is three or more;
each of the individual air intake passages is so disposed in a merging section between each of the individual air intake passages and the first merged air intake passage for the first cylinder group as to allow its axis to exist in a substantially identical radius about an axis of the first merged air intake passage and in a substantially equally spaced relationship and at a substantially equal angle around the axis of the first merged air intake passage; and
each of the individual air intake passages is so disposed in a merging section between each of the individual air intake passages and the second merged air intake passage for the second cylinder group as to allow its axis to exist in a substantially identical radius about an axis of the second merged air intake passage and in a substantially equally spaced relationship and at a substantially equal angle around the axis of the second merged air intake passage.

24. An intake piping structure for a multi-cylinder engine as claimed in claim 1, wherein:
the number of plural cylinders constituting each of the first cylinder group and the cylinder group is three;
the individual air intake passage for the cylinder out of three cylinders constituting the first cylinder group, interposed between the other two individual air intake passages and located in a middle position in the direction parallel to the crank axis, is so disposed in a merging section for the three individual air intake passages constituting the first cylinder group and the first merged air intake passage for the first cylinder group as to be located in a position higher than the other two individual air intake passages; and p1 the individual air intake passage for the cylinder out of three cylinders constituting the second cylinder group, interposed between the other two individual air intake passages and located in a middle position in the direction parallel to the crank axis, is so disposed in a merging section for the three individual air intake passages constituting the second cylinder group and the second merged air intake passage for the second cylinder group as to be located in a position higher than the other two individual air intake passages.

25. An intake piping structure for a multi-cylinder engine as claimed in claim 24, wherein the other two individual air intake passages are so disposed as to be equally high with each other.

26. An intake piping structure for a multi-cylinder engine as claimed in claim 24, wherein:
each of the individual air intake passages is so disposed in the merging section between each of the individual air intake passages and the first merged air intake passage for the first cylinder group as to allow its axis to exist in a substantially identical radius about an axis of the first merged air intake passage and in a substantially equally spaced relationship and at a substantially equal angle around the axis of the first merged air intake passage; and
each of the individual air intake passages is so disposed in the merging section between each of the individual air intake passages and the second merged air intake passage for the second cylinder group as to allow its axis to exist in a substantially identical radius about an axis of the second merged air intake passage and in a substantially equally spaced relationship and at a substantially equal angle around the axis of the second merged air intake passage.

27. An intake piping structure for a multi-cylinder engine as claimed in claim 1, wherein each of the individual air intake passages and each of the merged air intake passages are so disposed as to lie in a nearly horizontal direction over the cylinder head.

28. An intake piping structure for a multi-cylinder engine as claimed in claim 1, wherein:
the multi-cylinder engine is a V-type engine; and each of the individual air intake passages and each of the merged air intake passages, each located over the cylinder head, are so disposed as to lie nearly parallel to a plane intersecting a virtual straight line intersecting the crank axis and passing through a middle position between a right-hand bank and a left-hand bank.

* * * * *